(12) United States Patent
Telefus

(10) Patent No.: US 9,627,915 B2
(45) Date of Patent: Apr. 18, 2017

(54) SWEEP FREQUENCY MODE FOR MULTIPLE MAGNETIC RESONANT POWER TRANSMISSION

(71) Applicant: Flextronics AP, LLC, Broomfield, CO (US)

(72) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 377 days.

(21) Appl. No.: 13/865,038

(22) Filed: Apr. 17, 2013

(65) Prior Publication Data
US 2014/0266027 A1 Sep. 18, 2014

Related U.S. Application Data

(60) Provisional application No. 61/799,124, filed on Mar. 15, 2013.

(51) Int. Cl.
*H02J 7/00* (2006.01)
*H02J 7/02* (2016.01)
(Continued)

(52) U.S. Cl.
CPC .............. *H02J 7/025* (2013.01); *H02J 50/10* (2016.02); *H02J 50/12* (2016.02);
(Continued)

(58) Field of Classification Search
CPC .. H02J 7/025; H02J 17/00; H02J 50/10; H02J 50/12; H02J 50/40
(Continued)

(56) References Cited

U.S. PATENT DOCUMENTS

| 4,077,061 A | 2/1978 | Johnston |
| 4,122,359 A | 10/1978 | Breikss |

(Continued)

FOREIGN PATENT DOCUMENTS

WO WO 2012071268 A2 * 5/2012 ......... G01R 33/3692

OTHER PUBLICATIONS

U.S. Appl. No. 13/865,052, filed Apr. 17, 2013, Applicant: Mark Telefus, Examiner.: Diao, M. Baye, Art unit: 2859, Mail Date: May 29, 2015, 13 pages.

(Continued)

*Primary Examiner* — Richard Isla Rodas
*Assistant Examiner* — David V Henze-Gongola
(74) *Attorney, Agent, or Firm* — Haverstock & Owens LLP

(57) ABSTRACT

A power transmission pad is configured to provide wireless power transmission to multiple portable electronic devices where each device is orientation-free relative to the pad. The power transmission pad is also configured to be power adaptive by changing the power transmission level depending on the number of devices being concurrently charged. Each device, is placed within the magnetic field for the purpose of charging the device battery. The power transmission pad includes a sweep frequency generator for generating power transmissions across a frequency spectrum. The number of devices to be charged is determined as well as an optimal frequency for maximum energy transfer to each device. A single combined optimal frequency is determined using the optimal frequencies determined for each individual device. The sweep frequency generator is locked to the single combined optimal frequency and a power transmission level is set according to the number of devices.

28 Claims, 3 Drawing Sheets

(51) Int. Cl.
  *H04B 5/00* (2006.01)
  *H02J 50/12* (2016.01)
  *H02J 50/10* (2016.01)
  *H03K 17/00* (2006.01)
  *H02M 3/335* (2006.01)

(52) U.S. Cl.
  CPC ........ *H02M 3/33507* (2013.01); *H03K 17/00* (2013.01); *H04B 5/0037* (2013.01)

(58) Field of Classification Search
  USPC ........................................................ 320/108
  See application file for complete search history.

(56) References Cited

U.S. PATENT DOCUMENTS

| | | | |
|---|---|---|---|
| 4,234,920 A | 11/1980 | VanNess | |
| 4,245,289 A | 1/1981 | Mineck | |
| 4,327,298 A | 4/1982 | Burgen | |
| 4,381,457 A | 4/1983 | Wiles | |
| 4,489,394 A | 12/1984 | Borg | |
| 4,535,410 A | 8/1985 | O'Mara | |
| 4,611,289 A | 9/1986 | Coppola | |
| 4,642,616 A | 2/1987 | Goodwin | |
| 4,658,204 A | 4/1987 | Goodwin | |
| 4,703,191 A | 10/1987 | Ferguson | |
| 4,742,424 A | 5/1988 | Kautzer | |
| 4,750,040 A | 6/1988 | Hakamada | |
| 4,884,242 A | 11/1989 | Lacy | |
| 4,985,804 A | 1/1991 | Campbell | |
| 5,105,182 A | 4/1992 | Shindo | |
| 5,283,792 A | 2/1994 | Davies, Jr. | |
| 5,293,308 A * | 3/1994 | Boys ...................... H02J 5/005 324/392 |
| 5,437,040 A | 7/1995 | Campbell | |
| 5,717,936 A | 2/1998 | Uskali | |
| 5,724,026 A | 3/1998 | Allen | |
| 5,838,171 A | 11/1998 | Davis | |
| 5,974,551 A | 10/1999 | Lee | |
| 6,301,133 B1 | 10/2001 | Cuadra | |
| 6,333,650 B1 | 12/2001 | Amijn | |
| 6,480,809 B1 | 11/2002 | Slaight | |
| 6,535,996 B1 | 3/2003 | Brewer | |
| 6,768,222 B1 | 7/2004 | Ricks | |
| 7,395,452 B2 | 7/2008 | Nicholson | |
| 7,679,347 B2 | 3/2010 | He | |
| 7,986,059 B2 | 7/2011 | Randall | |
| 8,018,743 B2 | 9/2011 | Wang | |
| 8,193,662 B1 | 6/2012 | Carlson | |
| 8,233,298 B2 | 7/2012 | Jang | |
| 8,654,553 B1 | 2/2014 | Ye | |
| 8,829,849 B2 | 9/2014 | Kim et al. | |
| 8,928,275 B2 | 1/2015 | Elo | |
| 9,007,087 B2 | 4/2015 | Avritch | |
| 9,049,028 B2 | 6/2015 | Tajima | |
| 9,293,929 B2 | 3/2016 | Hong | |
| 2002/0121882 A1 | 9/2002 | Matsuo | |
| 2006/0146461 A1 | 7/2006 | Jones | |
| 2006/0198172 A1 | 9/2006 | Wood | |
| 2006/0208711 A1 | 9/2006 | Soldano | |
| 2007/0279955 A1 | 12/2007 | Liu | |
| 2008/0002444 A1 | 1/2008 | Shekhawat | |
| 2008/0130322 A1 | 6/2008 | Artusi | |
| 2009/0089604 A1 | 4/2009 | Malik | |
| 2009/0096413 A1 | 4/2009 | Partovi et al. | |
| 2009/0168472 A1 | 7/2009 | Chung | |
| 2009/0174263 A1* | 7/2009 | Baarman ................. H02J 5/005 307/104 |
| 2010/0045114 A1* | 2/2010 | Sample ................... H02J 5/005 307/104 |
| 2010/0103711 A1 | 4/2010 | Komatsuzaki | |
| 2010/0187913 A1* | 7/2010 | Smith .................. H04B 5/0081 307/104 |
| 2010/0254057 A1 | 10/2010 | Chen | |
| 2010/0289449 A1 | 11/2010 | Elo | |
| 2010/0332857 A1 | 12/2010 | Vogman | |
| 2011/0037444 A1 | 2/2011 | Wildash | |
| 2011/0112700 A1 | 5/2011 | Tajima | |
| 2011/0127843 A1* | 6/2011 | Karaoguz .......... G06K 7/10207 307/104 |
| 2011/0213999 A1 | 9/2011 | Lecourtier | |
| 2011/0215647 A1 | 9/2011 | Lecourtier | |
| 2011/0222318 A1 | 9/2011 | Uno | |
| 2012/0080957 A1* | 4/2012 | Cooper ................... H02J 5/005 307/104 |
| 2012/0144183 A1 | 6/2012 | Heinrichs | |
| 2012/0153917 A1 | 6/2012 | Adell | |
| 2013/0002036 A1* | 1/2013 | Kamata ................... H02J 5/005 307/104 |
| 2013/0003427 A1 | 1/2013 | Pan | |
| 2013/0016545 A1 | 1/2013 | Xu | |
| 2013/0155728 A1 | 6/2013 | Melanson | |
| 2013/0175872 A1* | 7/2013 | Simon ..................... H02J 5/005 307/104 |
| 2013/0329469 A1 | 12/2013 | Kubota | |
| 2014/0008979 A1 | 1/2014 | Kinnard | |
| 2014/0129425 A1 | 5/2014 | Yang et al. | |
| 2014/0266028 A1* | 9/2014 | Telefus .................... H02J 7/025 320/108 |
| 2014/0266029 A1* | 9/2014 | Telefus .................... H02J 7/025 320/108 |
| 2015/0052390 A1 | 2/2015 | Dryer | |

OTHER PUBLICATIONS

U.S. Appl. No. 13/865,077, filed Apr. 17, 2013, Applicant: Mark Telefus, Examiner.: Diao, M. Baye, Art unit: 2859, Mail Date: May 29, 2015, 17 pages.

Non-final Office Action that mailed Dec. 11, 2015, U.S. Appl. No. 13/865,052, filed Apr. 17, 2013, Applicant.: Mark Telefus, Examiner.: Diao, M.Baye, Art Unit.: 2859, 15 pages.

\* cited by examiner

SWEEP FREQUENCY MODE FOR MULTIPLE MAGNETIC RESONANT POWER TRANSMISSION

RELATED APPLICATIONS

This Patent Application claims priority under 35 U.S.C. 119(e) of the U.S. Provisional Application Ser. No. 61/799,124, filed Mar. 15, 2013, and entitled "New Power Management Integrated Circuit Partitioning With Dedicated Primary Side Control Winding". This application incorporates U.S. Provisional Application Ser. No. 61/799,124 in its entirety by reference.

FIELD OF THE INVENTION

The present invention is generally directed to the field of wireless power transmission. More specifically, the present invention is directed to using a sweep frequency mode for magnetic resonant power transmission.

BACKGROUND OF THE INVENTION

Portable electronics devices use batteries that require periodic recharging. Conventional recharging techniques include both wired and wireless approaches. In an exemplary wired recharging technique, an electrical power adapter includes an electrical cord and power converter for plugging into the portable device on one end and a power outlet, such as a wall socket, on the other end.

In an exemplary wireless recharging technique, a power supply pad is configured for wireless power transmission. The power supply pad is typically connected to wall socket via a power cord. The power supply pad includes a power transmitter for wireless power transmission to a portable electronics device having a power receiver. The power transmitter includes a communications processing block and a power transmitting element, such as a coiled wire antenna. The power transmitting element generates a magnetic field through which power is wirelessly transmitted. The magnetic field orientation is a function of the transmission frequency and the physical orientation of the power transmitting element. Conventional power supply pads transmit at a constant frequency, and since the physical orientation of the power transmitting element is also fixed, the magnetic field generated by the power transmitting element of the power supply pad has a specific fixed orientation. The portable electronic device, such as a cellular telephone, includes a communications processing block and a power receiving element, such as a coiled wire antenna. To receive power from the power supply pad, the portable electronic device must be positioned within range of the magnetic field generated by the power transmitting element of the power supply pad. For optimized energy transfer, the portable electronic device must also be properly oriented relative to the power transmission element. Due to the specific orientation of the magnetic field generated by the power transmission element, the power receiving element of the portable electronic device must be properly oriented with the magnetic field or else the wireless power transmission is not optimized or can not be completed. This requires meticulous placement of the portable electronic device on or near the power supply pad, which can be time consuming and frustrating for the end user.

In some applications, the power supply pad is fitted with a cradle, or other type of device place holder, sized to receive the portable electronic device in a specific orientation. The cradle is oriented within the power supply pad so that when the portable electronic device is positioned within the cradle, the power receiving element of the portable electronic device is properly aligned with the power transmission element, and therefore the magnetic field, of the power supply pad. However, having to place the portable electronic device within the cradle almost defeats the purpose of a wireless power transmission application designed for free placement of the device without need for a hard connection to a power source.

Conventional power supply pads are also configured to transmit a fixed amount of power. In applications designed to charge a single portable electronic device at a time, the power supply pad is designed and manufactured to transmit a fixed amount for power compatible for the single portable electronic device, for example 5W. In other applications, the power supply pad is intended for charging multiple devices concurrently. In this case, the power supply pad is designed and manufactured having a much larger fixed power transmission level, for example 15 W or 20 W. This fixed power transmission level is sufficient for peak power transfer to a maximum number of portable electronic devices. However, when fewer than the maximum number of devices are being charged, the power transmission level is excessive. Further, charging multiple devices concurrently suffers from the same orientation related issues as the single device system.

SUMMARY OF THE INVENTION

A power transmission pad is configured to provide wireless power transmission to multiple receiving devices where each receiving device is orientation-free relative to the pad. The power transmission pad is also configured to be power adaptive by changing the power transmission level depending on the number of receiving devices being concurrently charged. The pad functions as a transmitter and is magnetically "hot", meaning the pad generates a magnetic field when powered on. Each receiving device, such as a cell phone, tablet, or other portable electronic device, is placed within the magnetic field for the purpose of charging the device battery. In contrast to conventional wireless battery charging systems, there are no restrictions on the orientation of the portable electronic device relative to the pad. The power transmission pad includes a sweep frequency generator for generating power transmissions across a frequency spectrum. The number of portable electronic devices to be charged is determined as well as an optimal frequency for maximum energy transfer to each portable electronic device. In some embodiments, a single combined optimal frequency is determined using the optimal frequencies determined for each individual portable electronic device. The sweep frequency generator is locked to the single combined optimal frequency and a power transmission level is set according to the number of portable electronic devices. In other embodiments, the sweep frequency generator is set to change back and forth between the optimal frequencies determined for each portable electronic device.

In an aspect, a power transmission pad for wireless power transmission is disclosed. The power transmission pad include a coil, a power transmitter and a controller. The power transmitter includes a sweep frequency generator coupled to the coil to provide a frequency varying signal through the coil, thereby generating a variable magnetic field. The controller is coupled to the coil and to the sweep frequency generator. When one or more portable electronic devices to be charged are positioned within the variable magnetic field the power transmission pad is configured to determine a number of portable electronic devices positioned within the variable magnetic field and to adjust a power transmission level of a power transmission signal according to the determined number. In some embodiments, the power transmission pad is further configured to determine a resonant frequency for each portable electronic device corresponding to a maximum energy transfer from the power transmission pad to the portable electronic device, and to determine a frequency of the power transmission signal using the determined resonant frequency of each portable electronic device.

In another aspect, a system for wireless power transmission is disclosed. The system includes one or more portable electronic devices to be charged and a power transmission pad. The power transmission pad is configured to generate a variable magnetic field. When the one or more portable electronic devices are positioned within the variable magnetic field the power transmission pad is configured to determine a number of portable electronic devices positioned within the variable magnetic field and to adjust a power transmission level of a power transmission signal according to the determined number. In some embodiments, the power transmission pad is further configured to determine a resonant frequency for each portable electronic device corresponding to a maximum energy transfer from the power transmission pad to the portable electronic device, and to determine a frequency of the power transmission signal using the determined resonant frequency of each portable electronic device.

In yet another aspect, another system for wireless power transmission is disclosed. The system includes a power transmission pad and one or more portable electronic devices to be charged. The power transmission pad includes a first coil, a power transmitter and a controller. The power transmitter has a sweep frequency generator coupled to the first coil to provide a frequency varying signal through the first coil, thereby generating a variable magnetic field. The controller is coupled to the first coil and to the sweep frequency generator. Each portable electronic device includes a second coil and a power receiver. The power receiver is coupled to the second coil and is configured to receive energy transferred from the power transmission pad via the second coil. When the one or more portable electronic devices are positioned within the variable magnetic field generated by the power transmission pad, the controller is configured to determine a number of portable electronic devices positioned within the variable magnetic field, and to adjust a power transmission level of a power transmission signal according to the determined number. The controller is also configured to determine a resonant frequency for each portable electronic device corresponding to a maximum energy transfer from the power transmission pad to the portable electronic device, and to determine a frequency of the power transmission signal using the determined resonant frequency of each portable electronic device.

In some embodiments, the frequency is an average of the determined resonant frequency for each portable electronic device. In some embodiments, the power transmitter and the controller comprise a power source manager configured to adjust the power transmission level and the frequency of the power transmission signal according to the number of portable electronic devices currently being charged. In some embodiments, when one of the one or more portable electronic devices is positioned within the variable magnetic field generated by the power transmission pad, a handshake protocol is performed between the portable electronic device and the power transmission pad, and the power transmission pad is configured to determine the number of portable electronic devices positioned within the variable magnetic field by counting a number of handshake protocols. In some embodiments, when one of the one or more portable electronic devices becomes fully charged, is removed from the variable magnetic field, or a new portable electronic device is positioned within the variable magnetic field, the power transmission pad is configured to re-calibrate the power transmission level by determining an updated number of portable electronic devices to be charged, and to adjust the power transmission level according to the determined updated number. In some embodiments, when one of the one or more portable electronic devices becomes fully charged, is removed from variable magnetic field, or a new portable electronic device is positioned within the variable magnetic field, the power transmission pad is further configured to re-calibrate the frequency of the power transmission signal by determining the resonant frequency for each portable electronic device corresponding to the maximum energy transfer from the power transmission pad to the portable electronic device, and to determine the frequency of the power transmission signal using the determined resonant frequency of each portable electronic device.

In some embodiments, each portable electronic device includes a resonant tank including the second coil, and the resonant frequency corresponding to the maximum energy transfer comprises a resonant frequency of the resonant tank. In some embodiments, the power receiver also includes a power management block configured to monitor a charge level of a portable electronic device battery, and configured to generate a charge level status signal. In some embodiments, the charge level status signal includes a power transmission termination signal when the battery is fully charged. In some embodiments, the charge level status signal is transmitted to the power transmitter via the second coil and the first coil. In some embodiments, each portable electronic device also includes a battery charger coupled to the power receiver. In some embodiments, the one or more portable electronic devices are configured to provide communication signals to each other.

In some embodiments, determining the resonant frequency includes monitoring a charge current of the portable electronic device while the sweep frequency generator sweeps the transmission frequencies across a sweep frequency spectrum, and when the charge current exceeds a threshold level for a specific frequency it is determined that the specific frequency is the resonant frequency. In some embodiments, determining the resonant frequency includes monitoring a charge current of the portable electronic device while the sweep frequency generator sweeps the transmission frequencies across a sweep frequency spectrum, and selecting a specific frequency corresponding to the highest charge current as the resonant frequency. In some embodiments, determining the resonant frequency includes monitoring an impedance on the power transmission pad while the sweep frequency generator sweeps the transmission frequencies across a sweep frequency spectrum, wherein a change in the impedance corresponds to an energy transfer to the portable electronic device, and when the change in impedance exceeds a threshold level for a specific frequency it is determined that the specific frequency is the resonant frequency. In some embodiments, determining the resonant frequency includes monitoring an impedance on the power transmission pad while the sweep frequency generator sweeps the transmission frequencies across a sweep frequency spectrum, wherein a change in the impedance corresponds to an energy transfer to the portable electronic device, and selecting a specific frequency corresponding to a greatest change in impedance as the resonant frequency.

In yet another aspect, a method of wireless power transmission between a power transmission pad and one or more portable electronic devices to be charged is disclosed. The method includes configuring the power transmission pad with a first coil and a sweep frequency generator, and each portable electronic device with a second coil. The method also includes generating a variable magnetic field by applying the sweep frequency generator to the first coil, and determining a number of portable electronic devices positioned within the variable magnetic field. The method also includes adjusting a power transmission level of a power transmission signal according to the determined number, and transmitting the power transmission signal from the power transmission pad to the one or more portable electronic devices.

In some embodiments, when one of the one or more portable electronic devices is positioned within the variable magnetic field generated by the power transmission pad, a handshake protocol is performed between the portable electronic device and the power transmission pad, and the power transmission pad is configured to determine the number of portable electronic devices positioned within the variable magnetic field by counting a number of handshake protocols. In some embodiments, when one of the one or more portable electronic devices becomes fully charged, is removed from variable magnetic field, or a new portable electronic device is positioned within the variable magnetic field, the power transmission pad is configured to re-calibrate the power transmission level by determining an updated number of portable electronic devices to be charged, and to adjust the power transmission level according to the determined updated number.

In some embodiments, the method also includes measuring one or more system characteristics in response to the variable magnetic field, determining a resonant frequency of each portable electronic device according to the measured system characteristics, determining a frequency of the power transmission signal using the determined resonant frequency of each portable electronic device, locking an energy transmission frequency of the power transmission pad to the determined frequency, and transmitting the power transmission signal from the power transmission pad to the portable electronic device using the locked energy transmission frequency. In some embodiments, the frequency is an average of the determined resonant frequency for each portable electronic device. In some embodiments, when one of the one or more portable electronic devices becomes fully charged, is removed from variable magnetic field, or a new portable electronic device is positioned within the variable magnetic field, the power transmission pad is further configured to re-calibrate the locked energy transmission frequency by determining the resonant frequency for each portable electronic device corresponding to the maximum energy transfer from the power transmission pad to the portable electronic device, and to determine the frequency of the power transmission signal using the determined resonant frequency of each portable electronic device. In some embodiments, the system characteristic includes a charge current of the portable electronic device and determining the resonant frequency includes monitoring the charge current of the portable electronic device while the sweep frequency generator sweeps the transmission frequencies across a sweep frequency spectrum, and when the charge current exceeds a threshold level for a specific frequency it is determined that the specific frequency is the resonant frequency. In some embodiments, the system characteristic includes a charge current of the portable electronic device and determining the resonant frequency includes monitoring the charge current of the portable electronic device while the sweep frequency generator sweeps the transmission frequencies across a sweep frequency spectrum, and selecting a specific frequency corresponding to the highest charge current as the resonant frequency. In some embodiments, the system characteristic includes an impedance on the power transmission pad and determining the resonant frequency includes monitoring the impedance on the power transmission pad while the sweep frequency generator sweeps the transmission frequencies across a sweep frequency spectrum, wherein a change in the impedance corresponds to an energy transfer to the portable electronic device, and when the change in impedance exceeds a threshold level for a specific frequency it is determined that the specific frequency is the resonant frequency. In some embodiments, the system characteristic includes an impedance on the power transmission pad and determining the resonant frequency includes monitoring the impedance on the power transmission pad while the sweep frequency generator sweeps the transmission frequencies across a sweep frequency spectrum, wherein a change in the impedance corresponds to an energy transfer to the portable electronic device, and selecting a specific frequency corresponding to a greatest change in impedance as the resonant frequency.

In some embodiments, each portable electronic device includes a resonant tank including the second coil, and the determined resonant frequency corresponds to a resonant frequency of the resonant tank. In some embodiments, the method also includes monitoring a charge level of a portable electronic device battery, and generating a charge level status signal. In some embodiments, the charge level status signal includes a power transmission termination signal when the battery is fully charged. In some embodiments, the method also includes transmitting the charge level status signal from the portable electronic device to the power transmission pad. In some embodiments, the method also includes providing communication signals between the one or more portable electronic devices.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a method and system for wireless power transmission. Those of ordinary skill in the art will realize that the following detailed description of the method and system is illustrative only and is not intended to be in any way limiting. Other embodiments of the method and system will readily suggest themselves to such skilled persons having the benefit of this disclosure.

Reference will now be made in detail to implementations of the method and system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
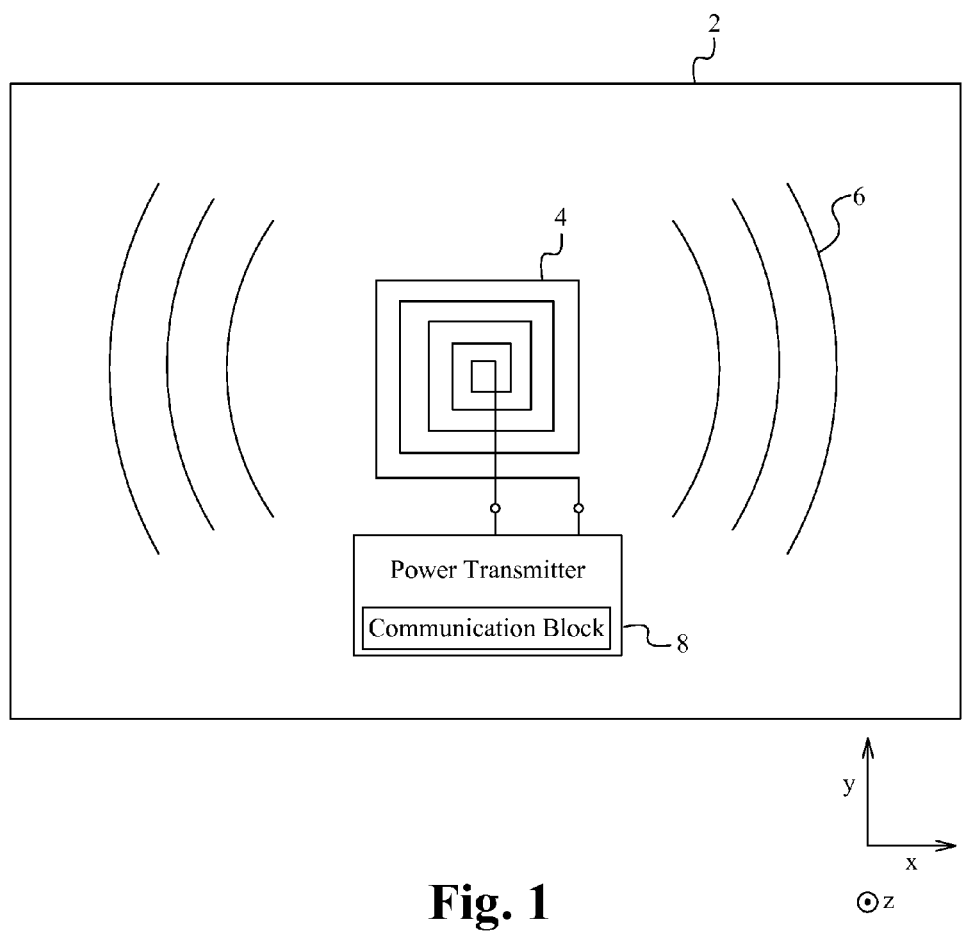
FIG. 1 illustrates a power transmission pad according to an embodiment.

FIG. 1 illustrates a power transmission pad according to an embodiment. The pad 2 includes a coil 4 coupled to a power transmitter 8. The power transmitter 8 is configured to provide frequency varying driving signals to the coil 4 thereby generating a variable magnetic field. The magnetic field strength diminishes with distance from the coil 4. The magnetic field is used to provide wireless energy transfer to a device placed within an effective area of the magnetic field. The effective area of the magnetic field is that area where the magnetic field strength is above a minimum level for effective energy transfer. In some embodiments, the effective area corresponds to an area of the pad. In some embodiments, the effective area extends beyond a perimeter of the pad. In most applications, the effective area is limited to a proximate area around the pad so as not to adversely effect other nearby electronic devices. The power transmitter 8 is also configured for bi-directional communications with an external device when properly magnetically coupled to the pad. The bi-directional communications include an energy transfer transmission from the pad to the device, and communication signaling from the device to the pad.

Although FIG. 1 shows the pad 4 and its corresponding magnetic field 6 in two-dimensions, the x-y plane, it is understood that the actual magnetic field extends in three-dimensions including the z-direction perpendicular to the plane of FIG. 1. The thickness of the pad 2 corresponds to the z-direction. In most configurations, the coil 4 for the pad 2 is within the pad 2, and the receiving device 20 (FIG. 3) including its corresponding coil 22 (FIG. 3) sits on top of the pad 2, thereby forming a three-dimensional orientation between the coil 2 and the coil 22.

Figure 2:
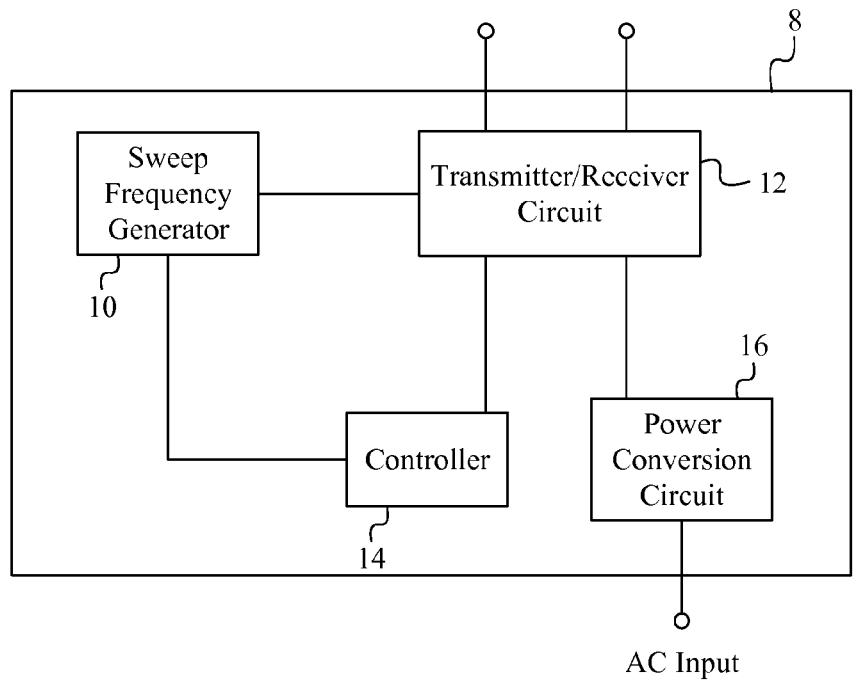
FIG. 2 illustrates a functional block diagram of the power transmitter 8 of FIG. 1 according to an embodiment.

FIG. 2 illustrates a functional block diagram of the power transmitter 8 of FIG. 1 according to an embodiment. The power transmitter 8 includes a sweep frequency generator 10, a transmitter/receiver circuit 12, a controller 14, and a power conversion circuit 16. In some embodiments, the sweep frequency generator is a wide range sweep frequency pulse power generator that generates pulsed driving signals at varying frequencies across a frequency spectrum. The transmitter/receiver circuit 12 applies the pulsed driving signals to the coil 4 thereby generating a variable magnetic field that varies according to the changing frequencies of the pulsed driving signals. The power conversion circuit 16 converts a received input power to a desired power transmission level, which is preferably a fixed value, for example 5 W. In some embodiments, the pad 8 receives power by plugging into an AC outlet. The controller 14 provides control of the power transmitter 8 such that a resonant frequency is determined and locked in for maximum power transfer to the receiving device 20 (FIG. 3).

Figure 3:
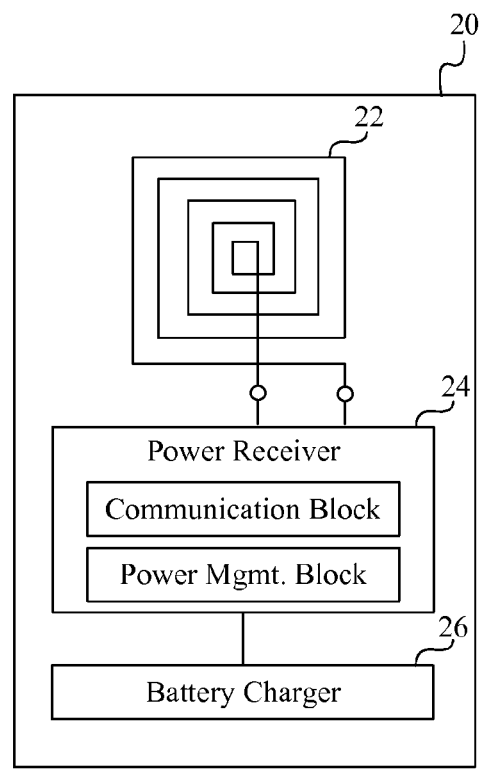
FIG. 3 illustrates a functional block diagram of a receiving device 20 according to an embodiment.

FIG. 3 illustrates a functional block diagram of a receiving device 20 according to an embodiment. In some embodiments, the receiving device 20 is a portable electronic device, for example a cellular telephone, a tablet, a laptop, or other electronic device periodically requiring battery charging. The receiving device 20 includes a coil 22, a power receiver 24, and a battery charger 26. In some embodiments, the coil 22 is the antenna element that is standard with most portable electronic devices. In other embodiments, the coil 22 is a separate element from the receiving device antenna. When the receiver device 20 is positioned within the effective area of the variable magnetic field 6 of the pad 2, the coil 4 and the coil 22 form a pseudo-transformer. When power is transferred from the pad 2 to the receiving device 20, the power receiver 24 receives the power transmission via the coil 22 and delivers power to the battery charger 26. The battery charger 26 can be any type of conventional battery charger.

The receiving device 20 is configured to establish a resonant tank magnetically coupled to the pad 2, and the resonant tank is configured to drive power to the battery charger 26 according to a fixed resonant frequency. The resonant tank is formed from the coil 22 and components within the power receiver 24. When the receiver device 20 is positioned within the effective area of the variable magnetic field 6 of the pad 2, the power transmitter 8 determines when a frequency of the variable magnetic field 6 matches resonance of the receiver device resonant tank. This matching frequency is referred to as the resonant frequency. The driving signal supplied to the coil 4 is locked at the resonant frequency and power is transmitted from the pad 2 to the receiving device 20.

Although reference is made to a resonant frequency, it is understood that such a frequency can represent any frequency that induces some degree of resonance in the pad-device system, and as such can be considered a quasi-resonant frequency. In general, a frequency is determined that corresponds to a maximum energy transfer for the given orientation of the receiving device 20 relative to the pad 2, and this frequency is referred to as the resonant frequency.

In some embodiments, the resonant frequency is determined by determining an amount of energy transfer for each frequency, or select frequencies, in the frequency spectrum used by the sweep frequency generator. On the pad side, this can be accomplished by monitoring a pad impedance, or some impedance on the pad, and looking for changes in this impedance. A change in the impedance signifies an energy transfer to the receiving device. The frequency having the greatest change in impedance is used as the resonant frequency. Similarly, an S-parameter (scattering parameter) corresponding to the pad can be determined for each frequency and the change in S-parameter can be used to determine the resonant frequency. The S-parameter is known to vary with frequency, and as such each frequency is associated with a frequency-specific baseline S-parameter, which is compared to the monitored S-parameter for that specific frequency.

On the receiving device side, the power receiver 24 can include a power management block coupled to the receiving device battery to monitor both the battery charge level and the rate of current charge for charging the battery. The rate of current charge will vary with changing frequency of the power transmission. The rate of current charge is compared to a threshold value, and if the rate of current charge exceeds the threshold value, then the frequency corresponding to the rate of current change that exceeds the threshold value is considered to be the resonant frequency. Alternatively, the rate of current charge is measured for each frequency, or select frequencies, and the frequency having the largest corresponding rate of current charge is considered to be the resonant frequency. It is understood that alternative means can be used, on either the pad side, the receiving device side, or both to determine the frequency corresponding to the greatest amount of energy transfer to the receiving device.

In some embodiments, the power management block in the power receiver 24 is configured to transmit a communication signal through the coil 22 to the magnetically coupled coil 4 on the pad 2. The transmitter/receiver circuit 12 and the controller 14 are configured to receive and interpret the communication signal. The communication signal includes control information, such as information for identifying the frequency corresponding to the maximum energy transfer. As such, the communication signal can be used to provide information for selecting the resonant frequency. In some embodiments, the communication signal is a simple binary signal, such as an indication that the rate of current charge has exceeded the threshold value. In other embodiments, the communication signal includes more detailed information, such as the rate of current charge at certain intervals, which can be matched to individual frequencies. The communication signal can also include control information related to a battery charge status. In some embodiments, the communication signal is a simple binary signal, such as an indication that the battery charge level is either full or not full. When the communication signal indicates the receiving device battery is full, the power transmission is terminated. In other embodiments, the communication signal includes more detailed information including, but not limited to, the amount that the receiving device battery is currently charged, for example 75% charged. The communication signal can be provided using any conventional means for transmitting a signal over magnetically coupled coils. An exemplary means for providing the communication signal is found in the co-owned, co-pending U.S. patent application Ser. No. 13/865,022, which is hereby incorporated in its entirety by reference.

By using a sweep frequency generator and determining the optimum frequency for maximum energy transfer, the power transmission pad functions as a universal charger. The pad is not limited to specifically configured receiving devices. Each receiving device has a certain Q factor. The Q factor is dependent on many conditions including, but not limited to, the transmission frequency, the antenna configuration, and the constituent components of the resonant tank. As a universal charger, it does not matter the size and shape of the antenna coil, the number and type of resonant elements in the resonant tank or the power transmission frequency. The power transmission pad is adaptive to determine the optimal resonance frequency for maximum power transfer regardless of receiving device type or position orientation relative to the pad.

In some embodiments, the power transmission pad is configured to transmit power at a fixed power transmission level. In other embodiments, the power transmission pad is configured to be power adaptive by changing the power transmission level depending on the number of receiving devices being concurrently charged. In this alternative embodiment, the pad remains a magnetically "hot" pad that generates variable high frequency power pulses using the sweeping algorithm of the sweep frequency generator. The resulting variable magnetic field is available for power transfer to multiple receiving devices positioned with the effective area of the variable magnetic field. Each receiving device is again fitted with a coil that can be used as an independent communication and energy transfer link. The communication block of each receiving device enables communication means to transmit communications over the receiving device coil to the power transmission pad.

In some embodiments, a handshake signal is passed between the receiving device and the pad when the receiving device is positioned within the effective area of the variable magnetic field. The pad recognizes the number of handshake signals and sets the power transmission level accordingly. In other embodiments, the number of receiving devices can be determined at the pad by measuring a change in a specific circuit parameter or parameters, such as a change in impedance or S-parameters in a manner similar to that described above for the single receiving device implementation. For example, changes in such measured parameters may be multiplied according to the number of receiving devices. In general, any conventional means for determining the number of receiving devices can be used. The pad is configured as a power management device so that once the number of receiving devices is determined the pad can adjust the amount of power transmitted according to the number of receiving devices.

Figure 4:
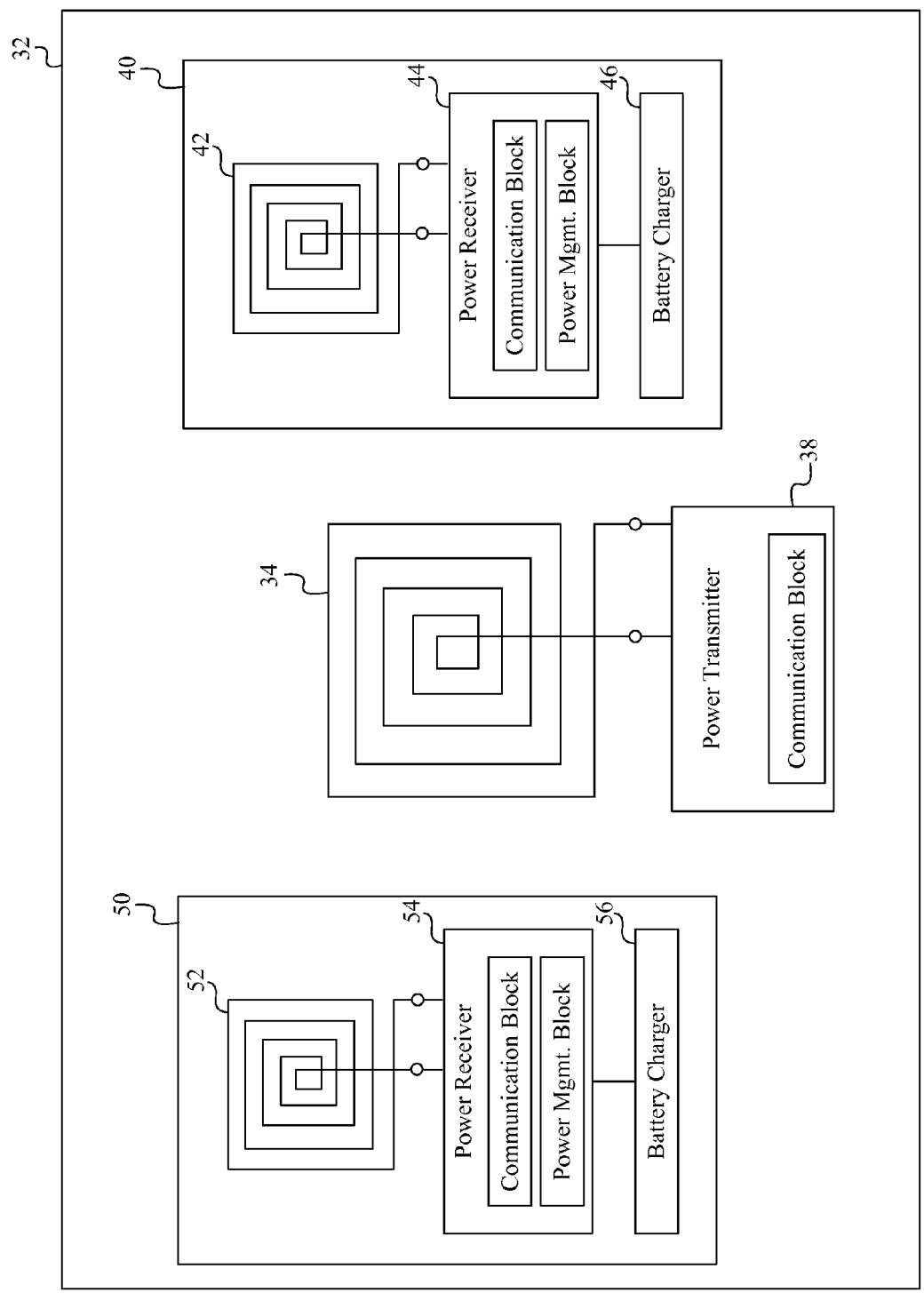
FIG. 4 illustrates a wireless power transmission system having a power transmission pad and two receiving devices according to an embodiment.

FIG. 4 illustrates a wireless power transmission system having a power transmission pad 32 and two receiving devices 40 and 50 according to an embodiment. The pad 32 is configured and operates similarly as the pad 2 in FIG. 1 with the added power management functionality for providing adaptive power to multiple receiving devices. The pad 32 also has the added functionality of determining an optimal power transmission frequency for each of multiple receiving devices and for implementing an optimized power transmission scheme to multiple devices. The pad 32 includes a coil 34 coupled to a power transmitter 38. The power transmitter 38 is configured to provide frequency varying driving signals to the coil 34 thereby generating a variable magnetic field. The magnetic field strength diminishes with distance from the coil 34. The power transmitter 38 is also configured for bi-directional communications with each receiving device when properly magnetically coupled to the pad.

Although the system in FIG. 4 shows only two receiving devices it is understood that the concepts can be extended to more than two receiving devices. The receiving device 40 includes a coil 42, a power receiver 44, and a battery charger 46. The receiving device 50 includes a coil 52, a power receiver 54, and a battery charger 56. In some embodiments, the coils 42 and 52 are antenna elements standard with most portable electronic devices. In other embodiments, the coils 42 and 52 are separate elements from the receiving device antenna. When the receiver device 40 is positioned within the effective area of the variable magnetic field of the pad 32, the coil 34 and the coil 42 form a pseudo-transformer. When power is transferred from the pad 32 to the receiving device 40, the power receiver 44 receives the power transmission via the coil 42 and delivers power to the battery charger 46. The battery charger 46 can be any type of conventional battery charger. The receiving device 50 functions in a similar manner relative to the pad 32.

The receiving device 40 is configured to establish a resonant tank magnetically coupled to the pad 32, and the resonant tank is configured to drive power to the battery charger 46 according to a fixed resonant frequency. The resonant tank is formed from the coil 42 and components within the power receiver 44. The receiving device 50 is configured to establish a resonant tank magnetically coupled to the pad 32, and the resonant tank is configured to drive power to the battery charger 56 according to a fixed resonant frequency. The resonant tank is formed from the coil 52 and components within the power receiver 54.

When the receiver device 40 is positioned within the effective area of the variable magnetic field of the pad 32, the power transmitter 38 determines when a frequency of the variable magnetic field matches resonance of the resonant tank in the receiver device 40. This matching frequency is referred to as the resonant frequency for the receiving device 40. Similarly, when the receiver device 50 is positioned within the effective area of the variable magnetic field of the pad 32, the power transmitter 38 determines when a frequency of the variable magnetic field matches resonance of the resonant tank in the receiver device 50. As described above, the resonant frequency of each receiving device is a function of the individual receiving device characteristics and also the receiving device orientation relative to the pad. Even if the two receiving devices 40 and 50 are identical, the corresponding resonant frequency matched to the pad 32 for each individual device is different since they do not both occupy the same physical space relative to the pad. As such, there will be at least a slight difference in the resonant frequency determined for the receiving device 40 and the resonant frequency determined for the receiving device 50. In practice, determining a separate resonant frequency for each receiving device 40 and 50 also accounts for differences in the resonant tank elements of each device.

Having determined the number of receiving devices currently positioned within the effective area of the pad 32, and also having determined the orientation-specific resonant frequency of each receiving device, the power transmitter 38 determines an appropriate waveform for the power transmission signal. The waveform defines the power transmission level, in the case of two receiving devices the power transmission level is doubled compared to the power transmission level for a single receiving device. For example, the power transmission level for two receiving devices is 10 W. In some embodiments, the frequency of the power transmission signal is a combination of the two determined resonant frequencies, such as an average value. It is understood that alternative methods can be used to determine the frequency of the power transmission signal using the resonant frequencies of the receiving devices. The driving signal supplied to the coil 34 is locked at the determined frequency and power is transmitted from the pad 32 to the receiving devices 40 and 50 at the appropriate power transmission level.

In other embodiments, the sweep frequency generator is not locked to a single frequency. Instead, the sweep frequency generator is controlled to alternate between the determined resonant frequencies for each receiving device. For example, if the receiving device 40 is determined to have a first resonant frequency and the receiving device 50 is determined to have a second resonant frequency, then the sweep frequency generator alternates from the first resonant frequency to the second resonant frequency, back to the first resonant frequency, then to the second resonant frequency, and so on.

The power management blocks in each receiving device 40 and 50 function similarly as the power management block in the receiving device 20. Once a given receiving device is fully charged, it is disconnected from further charging. In some embodiments, upon disconnecting a receiving device, the power transmitter 38 is configured to recalibrate so as to adjust the power transmission level and the frequency of power transmission according to the remaining receiving devices still being charged. For example, if there were three receiving devices being charged and the power transmission level was 15 W, and one of the receiving devices becomes fully charged and is disconnected, the power transmitter adjusts the power transmission level downward for two receiving devices, such as to 10 W. The power transmission level adjustments can be made in fixed increments or decrements, for example 5 W per receiving device. Alternatively, power transmission level adjustments can be varied depending on any number of factors including, but not limited to, the number of devices being charged, the resonant frequencies of the receiving devices, and the amount of charge current for each receiving device. Additionally, the process of determining the resonant frequencies of the remaining devices being charged and determining the resulting frequency of the power transmission signal can again be performed. In this manner the power transmitter is a power source manager for adjusting the power transmission level and frequency according to the number of receiving devices currently being charged.

The power transmitter of the pad is configured as a full power management device. The power transmitter can adjust the transmission frequency of the power transmission signal and adjust the power level of the power transmission signal. The power transmitter can also determine the charge condition of each receiving device. The power transmitter can also use frequency discrimination to associate a specific resonant frequency to a specific receiving device for identification purposes and for streamlining the recalibration process when a receiving device is disconnected.

The power management block of each receiving device 40 and 50 operates similarly as the power management block in the receiving device 20 of FIG. 3. The power management block can be used to monitor a charge current in the receiving device, which can be used in the determination of the resonant frequency. The power management block can also be used to monitor a receiving device battery charge level and to transmit a battery charge status signal to the pad. The pad can include a communication block, either as part of the power transmitter or as a separate component, used to interpret communication signals sent from the receiving devices, such as the battery charge status signal.

In some embodiments, each receiving device can also be a transmitter to other receiving devices, thereby enabling a distributed communication system. In this manner, communication signals can be sent between receiving devices, in addition to being sent between receiving device and pad, to make provide a more effective overall power management system.

The present application has been described in terms of specific embodiments incorporating details to facilitate the understanding of the principles of construction and operation of the method and system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A power transmission pad for wireless power transmission comprising:
   a. a coil;
   b. a power transmitter having a sweep frequency generator coupled to the coil to provide a frequency varying signal through the coil, thereby generating a variable magnetic field; and
   c. a controller coupled to the coil and to the sweep frequency generator, wherein when a plurality of portable electronic devices to be charged are positioned within the variable magnetic field a handshake protocol is performed between each of the portable electronic devices and the power transmission pad, wherein the power transmission pad is configured to determine the number of portable electronic devices positioned within the variable magnetic field by counting a number of handshake protocols and to adjust a power transmission level of a power transmission signal according to the determined number, wherein the power transmission pad is further configured to determine an optimal device frequency from the frequency varying signal for each portable electronic device where the optimal device frequency corresponds to a frequency where a maximum energy transfer occurs from the power transmission pad to the portable electronic device, and to determine an optimal system frequency of the power transmission signal using the determined optimal device frequency of each portable electronic device, wherein the optimal system frequency is an average of the determined optimal device frequency for each portable electronic device.

2. A system for wireless power transmission comprising:
   a. a plurality of portable electronic devices to be charged; and
   b. a power transmission pad configured to generate a frequency varying signal that results in a variable magnetic field, further wherein when the plurality of portable electronic devices are positioned within the variable magnetic field a handshake protocol is performed between each of the portable electronic devices and the power transmission pad, wherein the power transmission pad is configured to determine the number of portable electronic devices positioned within the variable magnetic field by counting a number of handshake protocols and to adjust a power transmission level of a power transmission signal according to the determined number, wherein the power transmission pad is further configured to determine an optimal device frequency from the frequency varying signal for each portable electronic device where the optimal device frequency corresponds to a frequency where a maximum energy transfer occurs from the power transmission pad to the portable electronic device, and to determine an optimal system frequency of the power transmission signal using the determined optimal device frequency of each portable electronic device, wherein the optimal system frequency is an average of the determined optimal device frequency for each portable electronic device.

3. A system for wireless power transmission comprising:
   a. a power transmission pad comprising:
      i. a first coil;
      ii. a power transmitter having a sweep frequency generator coupled to the first coil to provide a frequency varying signal through the first coil, thereby generating a variable magnetic field; and
      iii. a controller coupled to the first coil and to the sweep frequency generator;
   b. a plurality of portable electronic devices to be charged, each portable electronic device comprising:
      i. a second coil; and
      ii. a power receiver coupled to the second coil and configured to receive energy transferred from the power transmission pad via the second coil, wherein when the plurality of portable electronic devices are positioned within the variable magnetic field generated by the power transmission pad, a handshake protocol is performed between each of the portable electronic devices and the power transmission pad, wherein the power transmission pad is configured to determine the number of portable electronic devices positioned within the variable magnetic field by counting a number of handshake protocols, to adjust a power transmission level of a power transmission signal according to the determined number, to determine an optimal device frequency from the frequency varying signal for each portable electronic device where the optimal device frequency corresponds to a frequency where a maximum energy transfer occurs from the power transmission pad to the portable electronic device for a present orientation of the portable electronic device relative to the power transmission pad, and to determine an optimal system frequency of the power transmission signal using the determined optimal device frequency of each portable electronic device, wherein the optimal system frequency is an average of the determined optimal device frequency for each portable electronic device.

4. The system of claim 3 wherein the power transmitter and the controller comprise a power source manager configured to adjust the power transmission level and the optimal system frequency of the power transmission signal according to the number of portable electronic devices currently being charged.

5. The system of claim 3 wherein when one of the one or more portable electronic devices becomes fully charged, is removed from variable magnetic field, or a new portable electronic device is positioned within the variable magnetic field, the power transmission pad is configured to re-calibrate the power transmission level by determining an updated number of portable electronic devices to be charged, and to adjust the power transmission level according to the determined updated number.

6. The system of claim 5 wherein when one of the one or more portable electronic devices becomes fully charged, is removed from variable magnetic field, or a new portable electronic device is positioned within the variable magnetic field, the power transmission pad is further configured to re-calibrate the optimal system frequency of the power transmission signal by determining the optimal device frequency for each portable electronic device corresponding to the maximum energy transfer from the power transmission pad to the portable electronic device, and to determine the optimal system frequency of the power transmission signal using the determined optimal device frequency of each portable electronic device.

7. The system of claim 3 wherein each portable electronic device includes a resonant tank comprising the second coil, and the optimal device frequency corresponding to the maximum energy transfer comprises a resonant frequency of the resonant tank.

8. The system of claim 3 wherein the power receiver further comprises a power management block configured to monitor a charge level of a portable electronic device battery, and configured to generate a charge level status signal.

9. The system of claim 8 wherein the charge level status signal comprises a power transmission termination signal when the battery is fully charged.

10. The system of claim 8 wherein the charge level status signal is transmitted to the power transmitter via the second coil and the first coil.

11. The system of claim 3 wherein each portable electronic device further comprises a battery charger coupled to the power receiver.

12. The system of claim 3 wherein determining the optimal device frequency comprises monitoring a charge current of the portable electronic device while the sweep frequency generator sweeps the transmission frequencies across a sweep frequency spectrum, and when the charge current exceeds a threshold level for a specific frequency it is determined that the specific frequency is the optimal device frequency.

13. The system of claim 3 wherein determining the optimal device frequency comprises monitoring a charge current of the portable electronic device while the sweep frequency generator sweeps the transmission frequencies across a sweep frequency spectrum, and selecting a specific frequency corresponding to the highest charge current as the optimal device frequency.

14. The system of claim 3 wherein determining the optimal device frequency comprises monitoring an impedance on the power transmission pad while the sweep frequency generator sweeps the transmission frequencies across a sweep frequency spectrum, wherein a change in the impedance corresponds to an energy transfer to the portable electronic device, and when the change in impedance exceeds a threshold level for a specific frequency it is determined that the specific frequency is the optimal device frequency.

15. The system of claim 3 wherein determining the optimal device frequency comprises monitoring an impedance on the power transmission pad while the sweep frequency generator sweeps the transmission frequencies across a sweep frequency spectrum, wherein a change in the impedance corresponds to an energy transfer to the portable electronic device, and selecting a specific frequency corresponding to a greatest change in impedance as the optimal device frequency.

16. The system of claim 3 wherein the one or more portable electronic devices are configured to provide communication signals to each other.

17. A method of wireless power transmission between a power transmission pad and a plurality of portable electronic devices to be charged, the method comprising:
 a. configuring the power transmission pad with a first coil and a sweep frequency generator, and each portable electronic device with a second coil;
 b. generating a frequency varying signal that results in a variable magnetic field by applying the sweep frequency generator to the first coil;
 c. determining a number of portable electronic devices positioned within the variable magnetic field by counting a number of handshake protocols which are performed between each of the portable electronic devices and the power transmission pad when the portable electronic devices are positioned within the variable magnetic field;
 d. adjusting a power transmission level of a power transmission signal according to the determined number;
 e. transmitting the power transmission signal from the power transmission pad to the plurality of portable electronic devices;
 f. measuring one or more system characteristics in response to the variable magnetic field;
 g. determining an optimal device frequency of each portable electronic device according to the measured system characteristics, wherein the optimal device frequency corresponds to a frequency where a maximum energy transfer occurs from the power transmission pad to the portable electronic device;
 h. determining an optimal system frequency of the power transmission signal using the determined optimal device frequency of each portable electronic device, wherein the optimal system frequency is an average of the determined optimal device frequency for each portable electronic device;
 i. locking an energy transmission frequency of the power transmission pad to the determined optimal system frequency; and
 j. transmitting the power transmission signal from the power transmission pad to the portable electronic device using the locked energy transmission frequency.

18. The method of claim 17 wherein when one of the one or more portable electronic devices becomes fully charged, is removed from variable magnetic field, or a new portable electronic device is positioned within the variable magnetic field, the power transmission pad is configured to re-calibrate the power transmission level by determining an updated number of portable electronic devices to be charged, and to adjust the power transmission level according to the determined updated number.

19. The method of claim 17 wherein when one of the one or more portable electronic devices becomes fully charged, is removed from variable magnetic field, or a new portable electronic device is positioned within the variable magnetic field, the power transmission pad is further configured to re-calibrate the locked energy transmission frequency by determining the optimal device frequency for each portable electronic device corresponding to the maximum energy transfer from the power transmission pad to the portable electronic device, and to determine the optimal system frequency of the power transmission signal using the determined optimal device frequency of each portable electronic device.

20. The method of claim 17 wherein the system characteristic comprises a charge current of the portable electronic device and determining the optimal device frequency comprises monitoring the charge current of the portable electronic device while the sweep frequency generator sweeps the transmission frequencies across a sweep frequency spectrum, and when the charge current exceeds a threshold level for a specific frequency it is determined that the specific frequency is the optimal device frequency.

21. The method of claim 17 wherein the system characteristic comprises a charge current of the portable electronic device and determining the resonant frequency comprises monitoring the charge current of the portable electronic device while the sweep frequency generator sweeps the transmission frequencies across a sweep frequency spectrum, and selecting a specific frequency corresponding to the highest charge current as the resonant frequency.

22. The method of claim 17 wherein the system characteristic comprises an impedance on the power transmission pad and determining the optimal device frequency comprises monitoring the impedance on the power transmission pad while the sweep frequency generator sweeps the transmission frequencies across a sweep frequency spectrum, wherein a change in the impedance corresponds to an energy transfer to the portable electronic device, and when the change in impedance exceeds a threshold level for a specific frequency it is determined that the specific frequency is the optimal device frequency.

23. The method of claim 17 wherein the system characteristic comprises an impedance on the power transmission pad and determining the optimal device frequency comprises monitoring the impedance on the power transmission pad while the sweep frequency generator sweeps the transmission frequencies across a sweep frequency spectrum, wherein a change in the impedance corresponds to an energy transfer to the portable electronic device, and selecting a specific frequency corresponding to a greatest change in impedance as the optimal device frequency.

24. The method of claim 17 wherein each portable electronic device includes a resonant tank comprising the second coil, and the determined optimal device frequency corresponds to a resonant frequency of the resonant tank.

25. The method of claim 17 further comprising monitoring a charge level of a portable electronic device battery, and generating a charge level status signal.

26. The method of claim 25 wherein the charge level status signal comprises a power transmission termination signal when the battery is fully charged.

27. The method of claim 25 further comprising transmitting the charge level status signal from the portable electronic device to the power transmission pad.

28. The method of claim 17 further comprising providing communication signals between the one or more portable electronic devices.

* * * * *